United States Patent
Oettinger et al.

(10) Patent No.: US 7,477,846 B2
(45) Date of Patent: Jan. 13, 2009

(54) METHOD OF REDUCING CONTROL PACKET TRANSMISSION RATE FOR AN OPTICAL WIRELESS LINK

(75) Inventors: Eric G. Oettinger, Rochester, MN (US); Karl K. Northrup, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 1105 days.

(21) Appl. No.: 10/146,091

(22) Filed: May 14, 2002

(65) Prior Publication Data

US 2004/0208530 A1    Oct. 21, 2004

(51) Int. Cl.
*H04B 10/00*    (2006.01)
(52) U.S. Cl. .................. 398/118; 398/123; 398/124
(58) Field of Classification Search ......... 398/118–124, 398/128–131, 169–170
See application file for complete search history.

(56) References Cited

U.S. PATENT DOCUMENTS

| | | | | |
|---|---|---|---|---|
| 5,805,585 A | * | 9/1998 | Javitt et al. ................ | 370/342 |
| 6,201,230 B1 | * | 3/2001 | Crowther et al. ......... | 250/203.6 |
| 6,268,944 B1 | * | 7/2001 | Szapiel ..................... | 398/129 |
| 6,763,195 B1 | * | 7/2004 | Willebrand et al. ......... | 398/115 |

* cited by examiner

*Primary Examiner*—Dzung D Tran
(74) *Attorney, Agent, or Firm*—William B. Kempler; W. James Brady, III; Frederick J. Telecky, Jr.

(57) ABSTRACT

A method that does not rely on signal strength for detecting the presence of a broken optical wireless link. The method controls the packet transfer rate in a manner that minimizes both network overhead and computational requirements. Upon completion of the acquisition process, the control packet transfer rate is significantly reduced, since a high control packet transmission rate is only necessary during the acquisition process in order to expedite the acquisition process. The need for reacquisition is based, for example, on the number of consecutive missing packets, or the rate of missing versus received packets.

15 Claims, 1 Drawing Sheet

METHOD OF REDUCING CONTROL PACKET TRANSMISSION RATE FOR AN OPTICAL WIRELESS LINK

BACKGROUND OF THE INVENTION

1. Field of the Invention

This invention relates generally to optical wireless communication links, and more particularly, to a method of reducing the control packet transmission rate for an optical wireless link.

2. Description of the Prior Art

An optical wireless link system consists of two stations (OWLs): Each of which contains an optical transmitter and an optical receiver. The transmitter is able to change the direction of its transmitted beam by known amounts of angular displacement. The receiver sees this motion and sends position correction information back to the transmitter. This feedback is used by a servo control loop to position the transmitted beam on the receiver of the remote station.

After two optical wireless units are aligned, some method is required to detect when the optical link is broken. This method most preferably has minimal impact on the system performance. Sending and processing position control packets in an optical wireless link requires significant computational overhead; and depending on the transfer rate, may significantly impact available bandwidth in the link.

In view of the foregoing, it would be both desirable and advantageous in the optical wireless communication art to provide a technique that does not rely on signal strength for detecting the presence of a broken optical wireless link. Additionally it is advantageous for the method to work in a variety of lighting conditions (outdoors/indoors, lights on/off, night/day).

SUMMARY OF THE INVENTION

The present invention is directed to a technique that does not rely on signal strength for detecting the presence of a broken optical wireless link. The technique controls the packet transfer rate in a manner that minimizes both network overhead and computational requirements.

Upon completion of the acquisition process, the control packet transfer rate is reduced, since a high control packet transmission rate is only necessary during the acquisition process in order to expedite the acquisition process. Upon completion of the acquisition process however, the main use of the packets is to detect a disrupted link; and the packet rate can be significantly reduced. The need for reacquisition is based on the number of consecutive missing packets, or the rate of missing versus received packets.

In one aspect of the invention, a technique that does not rely on signal strength for detecting the presence of a broken optical wireless link is implemented in a manner that frees up system resources in terms of computational capabilities.

In another aspect of the invention, a technique that does not rely on signal strength for detecting the presence of a broken optical wireless link is implemented in a manner that frees up system resources in terms of available bandwidth for data over the link.

In yet another aspect of the invention, a technique that does not rely on signal strength for detecting the presence of a broken optical wireless link is implemented in a manner that requires no additional electronics.

In still another aspect of the invention, a technique that does not rely on signal strength for detecting the presence of a broken optical wireless link is implemented using only straightforward software algorithms.

According to still another aspect of the invention, a technique that does not rely on signal strength for detecting the presence of a broken optical wireless link is implemented having a re-acquisition threshold substantially at the point where data can no longer effectively be transmitted across the link.

According to one embodiment, a method of controlling packet transmission across an optical wireless link (OWL), the method comprising the steps of transmitting control packets across an optical wireless link at a first transfer rate during a data acquisition process; and transmitting control packets across the optical wireless link at a second transfer rate subsequent to the data acquisition process.

According to another embodiment, a method of controlling packet transmission across an optical wireless link (OWL), the method comprising the steps of monitoring the optical wireless link to detect the occurrence of a broken link; transmitting control packets across the optical wireless link at a first transfer rate only when a link criterion is not met; and transmitting control packets across the optical wireless link at a second transfer rate only when the link criterion is met.

According to yet another embodiment, a method of controlling packet transmission across an optical wireless link (OWL), the method comprising the steps of transmitting control packets across the optical wireless link at a first transfer rate in the absence of a desired link criterion; and transmitting control packets across the optical wireless link at a second transfer rate only when the link criterion is met.

BRIEF DESCRIPTION OF THE DRAWINGS

Other aspects, features and advantages of the present invention will be readily appreciated, as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
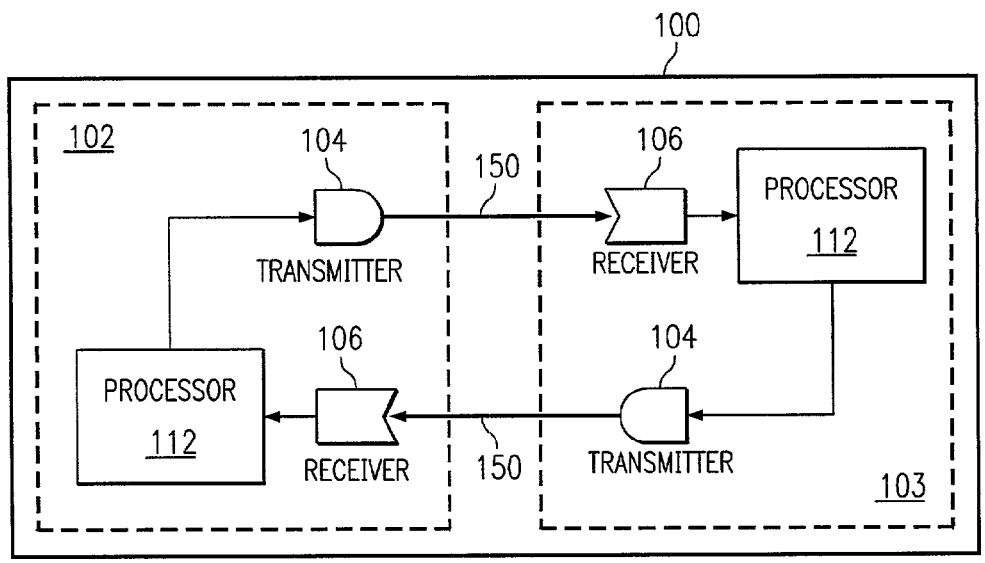
FIG. 1 is a block diagram illustrating a pair of OWLs communicating with one another in which each OWL includes a transmitter, receiver and a processor/controller.

FIG. 1 is a block diagram illustrating an OWL system 100 having a pair of OWLs 102, 103 communicating with one another in which each OWL includes a transmitter 104, a receiver 106 and a processor 112. Each transmitter 104 is able to change the direction of its transmitted beam by known amounts of angular displacement. The receiver 106 sees this motion as a linear displacement, and sends position correction information back to the remote station via transmitter 104. This feedback is used by a servo control loop algorithm to position the transmitted beam on the receiver 106 of the remote station.

After two optical wireless units are aligned, some method is required to detect when the optical link 150 is broken. This method most preferably has minimal impact on the system performance. Sending and processing position control packets in an optical wireless link requires significant computational overhead; and depending on the transfer rate, may significantly impact available bandwidth in the link, as stated herein before.

Figure 2:
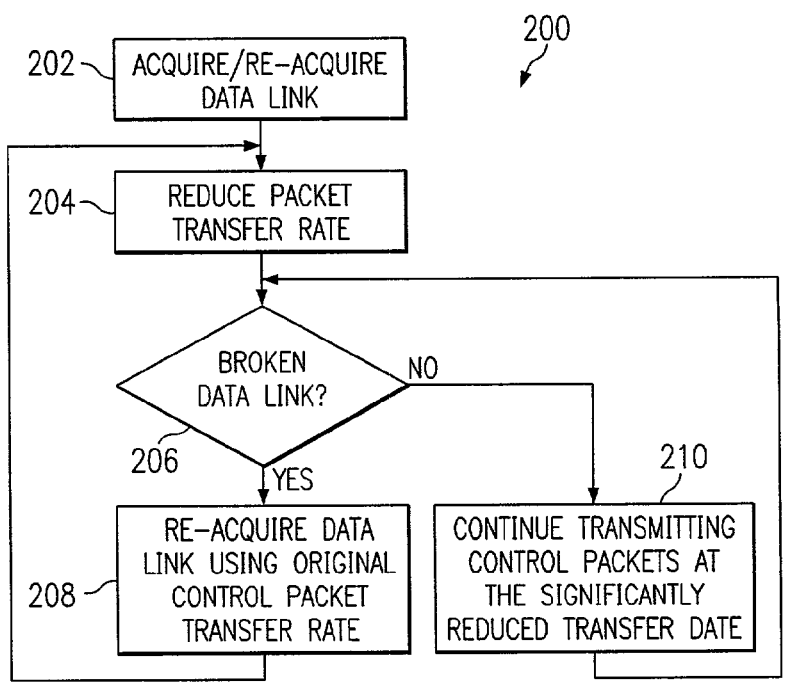
FIG. 2 is a flow chart depicting a method for reducing control packet transmission rate subsequent to acquisition or re-acquisition (i.e. during monitoring) of an optical wireless link according to one embodiment of the present invention.

Looking now at FIG. 2, a flow chart illustrates a method 200 for reducing control packet transmission rate subsequent to acquisition or re-acquisition (i.e. during monitoring) of an optical wireless link according to one embodiment of the present invention. U.S. patent application Ser. No. 09/940,763, entitled Method And Apparatus For Aligning Optical Wireless Link, filed on Aug. 27, 2001 by Heminger et al., claiming benefit of Provisional Application Ser. No. 60/285,461, filed on Apr. 20, 2001, now U.S. Pat. No. 6,915,080; U.S. patent application Ser. No. 09/942,265, entitled Method And Apparatus For Re-Acquisition After Link Disruption In An Optical Wireless Link, filed on Aug. 27, 2001 by Oettinger et al., claiming benefit of Provisional Application Ser. No. 60/285,460, filed on Apr. 20, 2001; and U.S. patent application Ser. No. 10/118,789, entitled Method Of Controlling Alignment Of An Optical Wireless Communication Link, filed on Apr. 9, 2002 by Eric G. Oettinger all describe particular acquisition and re-acquisition techniques associated with optical wireless links. All of these patent applications are assigned to Texas Instruments Incorporated, the assignee of the present application, and are incorporated by reference in their entirety herein.

With continued reference now to FIG. 2, following acquisition or re-acquisition of an optical wireless link as shown in blocks 202 and 208, the method 200 depicted in FIG. 2 commences by significantly reducing the control packet transfer rate as seen in block 204 so long as the data link is not broken. This significant reduction in control packet transfer rate does not occur during the acquisition or re-acquisition process, since, as stated herein before, a high control packet transmission rate allows for more rapid acquisitions, which is desirable during both acquisition and re-acquisition of an optical wireless link. Subsequent to completion of the acquisition process however, the primary use of the packets is to detect a disrupted link. The packet transmission rate can therefore be significantly reduced to free up system resources, both in terms of computational capabilities, and in bandwidth for data transmission over the link, as discussed herein before. The process then continues as seen in block 206 by continuous monitoring of the optical wireless link to determine if re-acquisition of the link is necessary. This determination can be made for example, based on a predetermined number of consecutive missing packets, or a predetermined rate of missing versus received packets, among other re-acquisition criteria. If the re-acquisition criterion is met, then the control packet transfer rate is again increased to its normal acquisition/re-acquisition control packet transfer rate as depicted in block 208, and the data link is re-acquired. If, on the other hand, the re-acquisition criterion is not met, then the control packet transfer rate remains at its significantly reduced transmission rate as depicted in block 210.

Implementing method 200 importantly requires no extra electronics or hardware of any kind; and the algorithmic software is straightforward. The method 200 described herein above has been found by the present inventors to be more immune to distance and visibility variation than the signal strength approach. Those skilled in the optical wireless communication art will appreciate the threshold specified in a signal strength approach must have some margin that may make re-acquisitions occur more frequently than necessary. Because control and data transmission physically go through the same channel, method 200, employs an effective threshold substantially at the exact point where data can no longer be transmitted and received across the link.

In view of the above, it can be seen the present invention presents a significant advancement in the art of optical wireless communication techniques. Further, this invention has been described in considerable detail in order to provide those skilled in the optical wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of controlling packet transmission across an optical wireless link (OWL), the method comprising the steps of:

transmitting control packets from a first transmitter across an optical wireless link at a first transfer rate during a link acquisition process; and transmitting control packets across from the first transmitter the optical wireless link at a second transfer rate subsequent to the link acquisition process, wherein the second transfer rate is significantly less than the first transfer rate.

2. The method according to claim 1 further comprising the steps of:

monitoring the optical wireless link to detect the occurrence of a broken link;

transmitting control packets across the optical wireless link at the first transfer rate only when a broken link criterion is met; and transmitting control packets across the optical wireless link at the second transfer rate only when the broken link criterion is not met.

3. The method according to claim 2 wherein the broken link criterion comprises consecutively missing a desired number of packets.

4. The method according to claim 2 wherein the broken link criterion comprises missing a predetermined number of packets with respect to a predetermined number of received packets.

5. A method of controlling packet transmission across an optical wireless link (OWL), the method comprising the steps of:

monitoring the optical wireless link to detect the occurrence of a broken link;

transmitting control packets across the optical wireless link from a first transmitter at a first transfer rate only when a broken link criterion is met; and transmitting control packets across the optical wireless link from the first transmitter at a second transfer rate only when the broken link criterion is not met wherein the second transfer rate is significantly less than the first transfer rate.

6. The method according to claim 5 wherein the step of monitoring the optical wireless link to detect the occurrence of a broken link comprises monitoring the optical wireless link after a data acquisition process.

7. The method according to claim 5 wherein the step of monitoring the optical wireless link to detect the occurrence of a broken link comprises monitoring the optical wireless link after a data re-acquisition process.

8. The method according to claim 5 wherein the step of transmitting control packets across the optical wireless link at a first transfer rate only when a broken link criterion is met comprises transmitting control packets across the optical wireless link at the transfer first rate substantially higher than the second transfer rate upon the occurrence of a predetermined number of consecutively missed packets.

9. The method according to claim 5 wherein the step of transmitting control packets across the optical wireless link at a first transfer rate only when a broken link criterion is met comprises transmitting control packets across the optical wireless link at the first transfer rate substantially higher than the second transfer rate upon the occurrence of a predetermined rate of missing versus received packets.

10. The method according to claim 5 wherein the step of transmitting control packets across the optical wireless link at a second transfer rate only when the broken link criterion is not met comprises transmitting control packets across the optical wireless link at the first transfer rate substantially less than the first transfer rate upon the absence of a predetermined number of consecutively missed packets.

11. The method according to claim 5 wherein the step of transmitting control packets across the optical wireless link at a second transfer rate only when the broken link criterion is not met comprises transmitting control packets across the optical wireless link at the first transfer rate substantially less than the first transfer rate upon the absence of a predetermined rate of missing versus received packets.

12. A method of controlling packet transmission across an optical wireless link (OWL), the method comprising the steps of:
  transmitting control packets across the optical wireless link from a first_transmitter at a first transfer rate in the presence of a broken link criterion; and
  transmitting control packets across the optical wireless link from the first transmitter at a second transfer rate only when the broken link criterion is not met, wherein the step of transmitting control packets across the optical wireless link at a first transfer rate in the presence of a broken link criterion comprises transmitting control packets across the optical wireless link at a first transfer rate in the presence of a predetermined number of missing versus received packets and wherein the first transfer rate is substantially greater than the second transfer rate.

13. The method according to claim 12 wherein the step of transmitting control packets across the optical wireless link at a first transfer rate in the presence of a broken link criterion comprises transmitting control packets across the optical wireless link at the first transfer rate in the presence of a predetermined number of consecutively missed packets.

14. A method of controlling packet transmission across an optical wireless link (OWL), the method comprising the steps of:
  transmitting control packets across the optical wireless link from a first transmitter at a first transfer rate in the presence of a broken link criterion; and
  transmitting control packets across the optical wireless link from the first transmitter at a second transfer rate only when the broken link criterion is not met wherein the step of transmitting control packets across the optical wireless link at a second transfer rate only when the broken link criterion is not met comprises transmitting control packets across the optical wireless link at the second transfer rate only upon the absence of a predetermined number of consecutively missed packets and wherein the second transfer rate is substantially less than the first transfer rate.

15. A method of controlling packet transmission across an optical wireless link (OWL), the method comprising the steps of:
  transmitting control packets across the optical wireless link from a first transmitter at a first transfer rate in the presence of a broken link criterion; and
  transmitting control packets across the optical wireless link from the first transmitter at a second transfer rate only when the broken link criterion is not met wherein the step of transmitting control packets across the optical wireless link at a second transfer rate only when the broken link criterion is not met comprises transmitting control packets across the optical wireless link at the second transfer rate only upon the absence of a predetermined rate of missing versus received packets and wherein the second transfer rate is substantially less than the first transfer rate.

* * * * *